United States Patent
Kurui et al.

(10) Patent No.: US 12,510,500 B2
(45) Date of Patent: Dec. 30, 2025

(54) SENSOR AND SENSOR SYSTEM

(71) Applicant: KABUSHIKI KAISHA TOSHIBA, Tokyo (JP)

(72) Inventors: Yoshihiko Kurui, Chigasaki Kanagawa (JP); Hiroaki Yamazaki, Yokohama Kanagawa (JP); Yosuke Akimoto, Yokohama Kanagawa (JP); Ping Wang, Fujisawa Kanagawa (JP); Fumitaka Ishibashi, Tokyo (JP); Yumi Hayashi, Ayase Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 174 days.

(21) Appl. No.: 18/173,719

(22) Filed: Feb. 23, 2023

(65) Prior Publication Data
US 2024/0068970 A1    Feb. 29, 2024

(30) Foreign Application Priority Data
Aug. 25, 2022   (JP) .................................. 2022-134146

(51) Int. Cl.
G01N 27/12    (2006.01)
(52) U.S. Cl.
CPC .................................. *G01N 27/12* (2013.01)
(58) Field of Classification Search
CPC .............................. G01N 27/12; G01N 27/18
See application file for complete search history.

(56) References Cited

U.S. PATENT DOCUMENTS

2002/0093860 A1    7/2002  Kato et al.
2007/0033449 A1    2/2007  Hwang et al.
(Continued)

FOREIGN PATENT DOCUMENTS

JP    2002-208294    7/2002
JP    2007-35245     2/2007
(Continued)

OTHER PUBLICATIONS

Japan Patent Office, Office Action in JP App. No. 2022-134146 (May 16, 2025).

*Primary Examiner* — Lee E Rodak
*Assistant Examiner* — Demetrius R Pretlow
(74) *Attorney, Agent, or Firm* — Finnegan, Henderson, Farabow, Garrett & Dunner, LLP

(57) ABSTRACT

According to one embodiment, a sensor includes a detection device, a switch circuit, and a detection circuit. The detection device includes a first detection section and a second detection section. The first detection section includes a first detection element. The first detection element includes a first conductive member and a first resistance member. The second detection section includes a second detection element. The second detection element includes a second conductive member and a second resistance member. In a first operation, the switch circuit is configured to supply a first current to the first conductive member and not to supply the first current to the second conductive member, and the detection circuit is configured to output a first signal corresponding to a difference between a first electrical resistance of the first resistance member and a second electrical resistance of the second resistance member.

12 Claims, 9 Drawing Sheets

(56) References Cited

U.S. PATENT DOCUMENTS

| | | | |
|---|---|---|---|
| 2007/0117207 A1* | 5/2007 | West | G01N 27/122 |
| | | | 436/27 |
| 2010/0294021 A1 | 11/2010 | Makino et al. | |
| 2020/0080954 A1 | 3/2020 | Yamazaki | |
| 2021/0182009 A1 | 6/2021 | Ohya | |
| 2022/0018820 A1 | 1/2022 | Hiramatsu et al. | |
| 2024/0272106 A1* | 8/2024 | Kawai | G01N 27/04 |

FOREIGN PATENT DOCUMENTS

| | | |
|---|---|---|
| JP | 2007-80513 | 3/2007 |
| JP | 2007-292730 A | 11/2007 |
| JP | 2020-41893 | 3/2020 |
| JP | 2021-96291 | 6/2021 |
| JP | 2022-19147 A | 1/2022 |

* cited by examiner

SENSOR AND SENSOR SYSTEM

CROSS-REFERENCE TO RELATED APPLICATIONS

This application is based upon and claims the benefit of priority from Japanese Patent Application No. 2022-134146, filed on Aug. 25, 2022; the entire contents of which are incorporated herein by reference.

FIELD

Embodiments described herein generally relate to a sensor and sensor system.

BACKGROUND

For example, there are sensors using MEMS (Micro Electro Mechanical Systems) elements. Stable detection is desired in the sensor.

DETAILED DESCRIPTION

Figure 1:
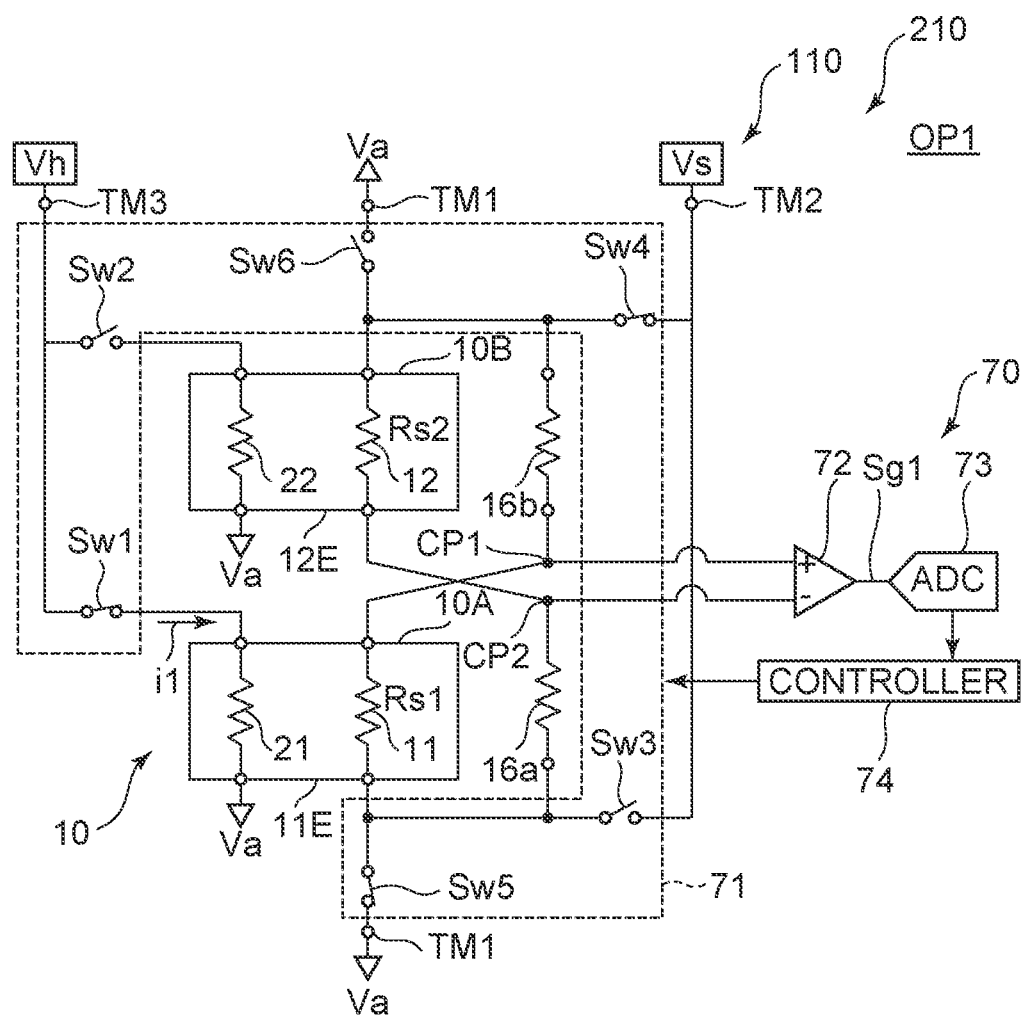
FIG. 1 is a circuit diagram illustrating a sensor according to a first embodiment.

According to one embodiment, a sensor includes a detection device, a switch circuit, and a detection circuit. The detection device includes a first detection section and a second detection section. The first detection section includes a first detection element. The first detection element includes a first conductive member and a first resistance member. The second detection section includes a second detection element. The second detection element includes a second conductive member and a second resistance member. In a first operation, the switch circuit is configured to supply a first current to the first conductive member and not to supply the first current to the second conductive member, and the detection circuit is configured to output a first signal corresponding to a difference between a first electrical resistance of the first resistance member and a second electrical resistance of the second resistance member. In a second operation, the switch circuit is configured to supply a second current to the second conductive member and not to supply the second current to the first conductive member, and the detection circuit is configured to output a second signal corresponding to the difference between the first electrical resistance and the second electrical resistance.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 2:
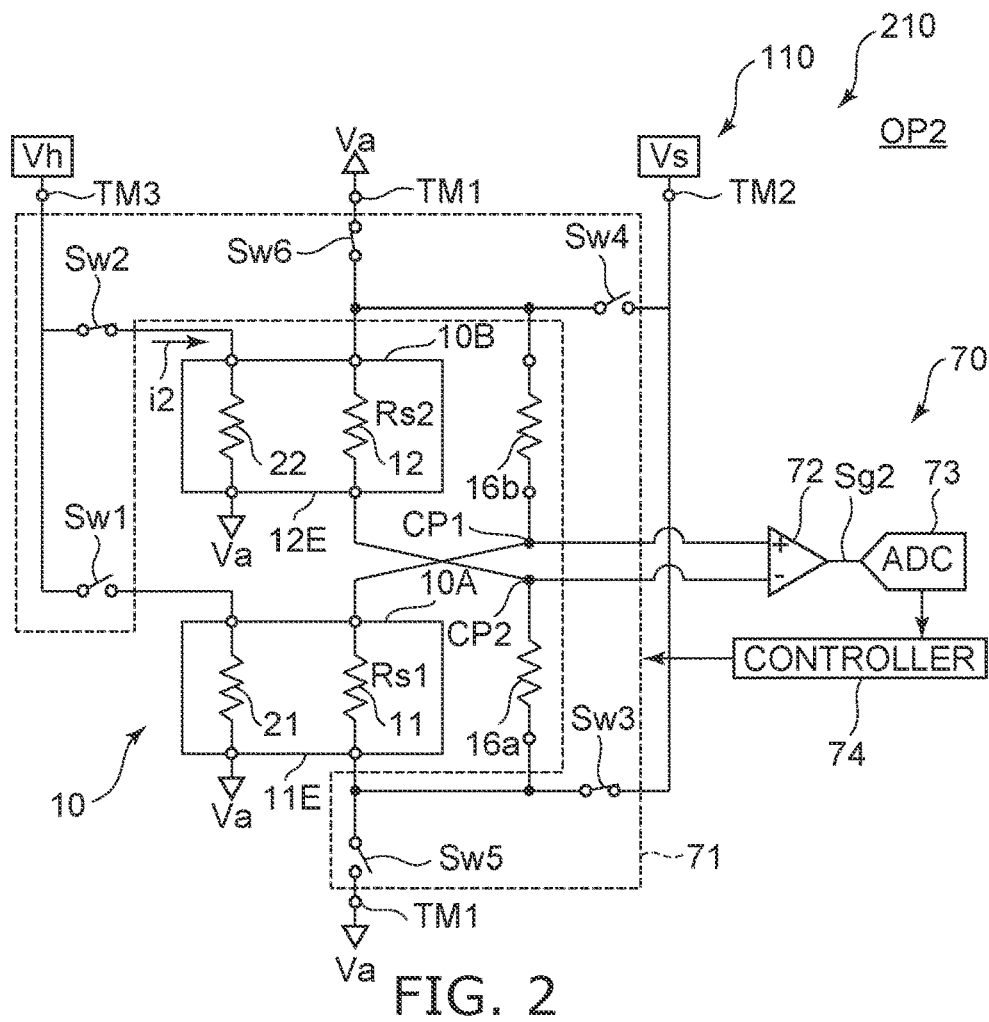
FIG. 2 is a circuit diagram illustrating a sensor according to the first embodiment.

FIGS. 1 and 2 are circuit diagrams illustrating a sensor according to a first embodiment.

As shown in FIGS. 1 and 2, a sensor 110 according to the embodiment includes a detection device 10, a switch circuit 71 and a detection circuit 72.

The detection device 10 includes a first detection section 10A and a second detection section 10B. The first detection section 10A includes a first detection element 11E. The first detection element 11E includes a first conductive member 21 and a first resistance member 11. The second detection section 10B includes a second detection element 12E. The second detection element 12E includes a second conductive member 22 and a second resistance member 12.

The switch circuit 71 and the detection circuit 72 are configured to execute a first operation OP1 and a second operation OP2. FIG. 1 corresponds to the first operation OP1. FIG. 2 corresponds to the second operation OP2.

As shown in FIG. 1, in the first operation OP1, the switch circuit 71 supplies a first current i1 to the first conductive member 21 and does not supply the first current i1 to the second conductive member 22. In the first operation OP1, the detection circuit 72 is configured to output a first signal Sg1 corresponding to a difference between a first electrical resistance Rs1 of the first resistance member 11 and a second electrical resistance Rs2 of the second resistance member 12.

As shown in FIG. 2, in the second operation OP2, the switch circuit 71 supplies a second current i2 to the second conductive member 22 and does not supply the second current i2 to the first conductive member 21. In the second operation OP2, the detection circuit 72 is configured to output a second signal Sg2 corresponding to the difference between the first electrical resistance Rs1 and the second electrical resistance Rs2. A magnitude of the second current i2 may be the same as a magnitude of the first current i1.

In the first operation OP1, a detection object is detected by the first detection element 11E. In the first operation OP1, the second detection element 12E functions as a reference element in the detection of the first detection element 11E. By using a reference element, more accurate detection result can be obtained.

In the second operation OP2, the detection object is detected by the second detection element 12E. In the second operation OP2, the first detection element 11E functions as a reference element in the detection of the second detection element 12E. By using a reference element, more accurate detection result can be obtained.

As described later, when a current is supplied to the conductive member, the temperature of the detection element rises. The characteristic of the temperature fall after the temperature rise of the detection element depends on the state of the surrounding detection object. The detection object can be detected by detecting the characteristic of the temperature fall by the resistance member.

Thus, in the embodiment, a current is supplied to the conductive member, and the temperature of the detection element rises. For example, a change in temperature (rise and fall) may change the characteristics of the resistance member. For example, a change in temperature (rising and falling) may cause a chemical change (e.g., oxidation) in the resistance member. For example, a change in temperature (rise and fall) may change the arrangement of atoms in the resistance member (crystal state, etc.). Changes in temperature (rise and fall) may change the characteristics of the conductive member. Therefore, the detection characteristics may change during the use of the sensor. Excessive changes in detection characteristics result in sensor lifetime.

As described above, in the embodiment, the first operation OP1 in which the first current i1 is supplied to the first conductive member 21 and the second operation OP2 in which the second current i2 is supplied to the second conductive member 22 are executed. As a result, the time period (and number of times) of the temperature change (rise and fall) is reduced as compared with a reference example in which the current is supplied to only one conductive member. In the embodiments, changes in detection characteristics can be suppressed. Changes in detection characteristics can be suppresses while maintaining high accuracy. According to the embodiment, a sensor capable of stable detection can be provided.

In the first operation OP1, for example, when the first current i1 is supplied to the first conductive member 21, the temperature of the first detection element 11E rises. As a result, the temperature of the first resistance member 11 rises. After the temperature of the first resistance member 11 rises, the temperature of the first resistance member 11 falls. The degree of lowering of the temperature of the first resistance member 11 is affected by the detection object (detection object gas, etc.) existing around the first detection element 11E. For example, the thermal conductivity differs depending on the type and concentration of the detection object. The detection object can be detected by detecting the characteristic of the lowering of the first electrical resistance Rs1 of the first resistance member 11.

In the first operation OP1, the first current i1 is not supplied to the second conductive member 22. Therefore, the temperature of the second detection element 12E does not substantially change. The second electrical resistance Rs2 of the second resistance member 12 is not affected by the detection object and is not substantially changed. By detecting a value corresponding to the difference between the first electrical resistance Rs1 which changes and the second electrical resistance Rs2 which does not change, the detection object can be more accurately detected.

In the second operation OP2, for example, when the second current i2 is supplied to the second conductive member 22, the temperature of the second detection element 12E rises. As a result, the temperature of the second resistance member 12 rises. After the temperature of the second resistance member 12 rises, the temperature of the second resistance member 12 falls. The degree of lowering of the temperature of the second resistance member 12 is affected by the detection object (detection object gas, etc.) existing around the second detection element 12E. For example, the thermal conductivity differs depending on the type and concentration of the detection object. The detection object can be detected by detecting the characteristic of the lowering of the second electrical resistance Rs2 of the second resistance member 12.

In the second operation OP2, the second current i2 is not supplied to the first conductive member 21. Therefore, the temperature of the first detection element 11E does not substantially change. The first electrical resistance Rs1 of the first resistance member 11 is not affected by the detection object and is not substantially changed. The detection object can be more accurately detected by detecting a value corresponding to the difference between the changing second electrical resistance Rs2 and the unchanged first electrical resistance Rs1.

The detection object is included in the atmosphere around the first detection element 11E and the second detection element 12E. In the first operation OP1, the first electrical resistance Rs1 changes according to the concentration of the detection object. In the first operation OP1, the second electrical resistance Rs2 does not change according to the concentration of the detection object.

Alternatively, the change in the second electrical resistance Rs2 according to the concentration in the first operation OP1 is smaller than the change in the first electrical resistance Rs1 according to the concentration in the first operation OP1.

In the second operation OP2, the second electrical resistance Rs2 changes according to the concentration of the detection object. In the second operation OP2, the first electrical resistance Rs1 does not change according to the concentration of the detection object.

Alternatively, the change in the first electrical resistance Rs1 according to the concentration in the second operation OP2 is smaller than the change in the second electrical resistance Rs2 according to the concentration in the second operation OP2.

In embodiments, the detection object may be gaseous or liquid. The detection object includes, for example, at least one selected from the group consisting of hydrogen, helium, argon, carbon monoxide, carbon dioxide, methane, propane, butane and sulfur hexafluoride ($SF_6$). The detection object may include, for example, at least one selected from the group consisting of nitrogen, oxygen, ammonia, acetone, and chlorine ($Cl_2$). The detection object may include, for example, alcohol.

As shown in FIGS. 1 and 2, in this example, the sensor 110 includes a first resistance element 16a and a second resistance element 16b. The first resistance element 16a and the second resistance element 16b may be provided in the detection device 10. The first resistance element 16a and the second resistance element 16b may be provided separately from the detection device 10.

The first resistance member 11, the second resistance member 12, the first resistance element 16a, and the second resistance element 16b are bridge-connected. The detection circuit 72 is configured to output a signal (first signal Sg1 or second signal Sg2) corresponding to a potential difference between a first connection point CP1 and a second connection point CP2. The first connection point CP1 is a connection point of the first resistance member 11 and the second resistance element 16b being bridge-connected. The second connection point CP2 is a connection point of the second resistance member 12 and the first resistance element 16a being bridge-connected. By using the bridge circuit, more accurate detection can be performed.

As shown in FIGS. 1 and 2, the switch circuit 71 may include a first switch Sw1, a second switch Sw2, a third switch Sw3, a fourth switch Sw4, a fifth switch Sw5, and a sixth switch Sw6.

The first switch Sw1 is electrically connected to the first conductive member 21. The second switch Sw2 is electrically connected to the second conductive member 22. For example, the first switch Sw1 is provided in a current path between the conductive member terminal TM3 and the first conductive member 21. For example, the second switch Sw2 is provided in a current path between the conductive member terminal TM3 and the second conductive member 22. A conductive member voltage Vg is applied to the conductive member terminal TM3. The first current i1 and the second current i2 are generated by the conductive member voltage Vg.

The third switch Sw3 is electrically connected to the first resistance member 11. The fourth switch Sw4 is electrically connected to the second resistance member 12. The fifth switch Sw5 is electrically connected to the first resistance member 11. The sixth switch Sw6 is electrically connected to the second resistance member 12.

The fifth switch Sw5 is provided in a current path between the first terminal TM1 and the first resistance member 11. The third switch Sw3 is provided in a current path between the second terminal TM2 and the first resistance member 11. The sixth switch Sw6 is provided in a current path between the first terminal TM1 and the second resistance member 12. The fourth switch Sw4 is provided in a current path between the second terminal TM2 and the second resistance member 12.

The first terminal TM1 is set to a fixed potential Va (ground potential, for example), for example. For example, a detection voltage Vs is applied to the second terminal TM2.

As shown in FIG. 1, when the third switch Sw3 is in a non-conductive state, the fourth switch Sw4 is in a conductive state, the fifth switch Sw5 is in the conductive state, and the sixth switch Sw6 is in the non-conductive state. At this time, the first switch Sw1 is in the conductive state, and the second switch Sw2 is in the non-conductive state.

As shown in FIG. 2, when the third switch Sw3 is in the conductive state, the fourth switch Sw4 is in the non-conductive state, the fifth switch Sw5 is in the non-conductive state, and the sixth switch Sw6 is in the conductive state. At this time, the first switch Sw1 is in the non-conductive state, and the second switch Sw2 is in the conductive state. The first operation OP1 and the second operation OP2 are switched by the switch circuit 71.

As shown in FIGS. 1 and 2, the sensor 110 may include an operation controller 74. The operation controller 74 may be included in the sensor 110. The operation controller 74 may be provided separately from the sensor 110.

The operation controller 74 is configured to control the switch circuit 71. The operation controller 74 is configured to control at least one of a transition from the first operation OP1 to the second operation OP2 or a transition from the second operation OP2 to the first operation OP1 in the switch circuit 71. The operation controller 74 controls, for example, the operations of the first switch Sw1, the second switch Sw2, the third switch Sw3, the fourth switch Sw4, the fifth switch Sw5, and the sixth switch Sw6.

As shown in FIGS. 1 and 2, the sensor 110 may include an AD converter 73. The outputs (the first signal Sg1 and the second signal Sg2) of the detection circuit 72 are converted into digital signals by the AD converter 73. The output of the AD converter 73 is supplied to the operation controller 74.

The operation controller 74 may execute the control operation based on the output of the AD converter 73.

An example of the operation of the sensor 110 will be described below. The operation described below may be controlled by, for example, the operation controller 74.

Figure 3:
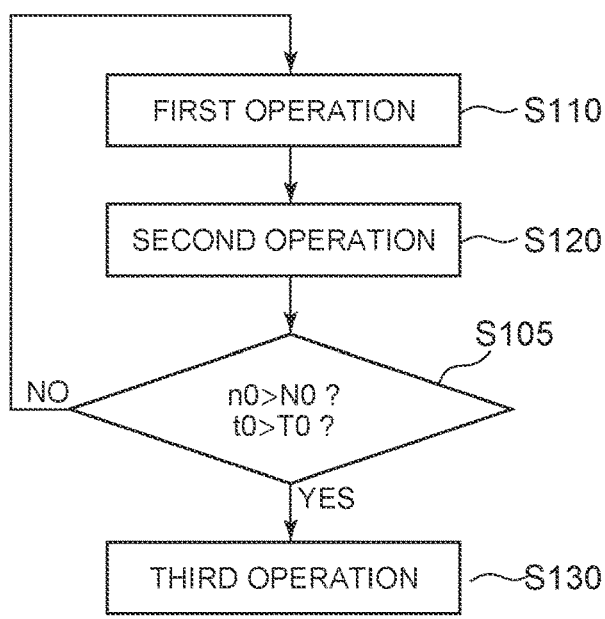
FIG. 3 is a flowchart illustrating the sensor according to the first embodiment.

FIG. 3 is a flowchart illustrating the sensor according to the first embodiment.

As shown in FIG. 3, the first operation OP1 is executed (step S110). The second operation OP2 is executed (step S120). An executing time number n0 of the first operation OP1 and the second operation OP2 is compared with a number N0 being determined. The executing time number n0 is an integer of 1 or more. Alternatively, the elapsed time t0 is compared with a value T0 being determined (step S105). If the executing time number n0 does not exceed the number N0 and the elapsed time t0 does not exceed the value T0, the process returns to step S110.

If the executing time number n0 exceeds the number N0 or the elapsed time t0 exceeds the value T0, the third operation is executed (step S130). In the third operation, for example, information (for example, an alarm) including that the end of life comes soon is output. The information is output, for example, by the operation controller 74.

Thus, the switch circuit 71 and the detection circuit 72 may repeat the set of the first operation OP1 and the second operation OP2. The executing the first operation OP1 and the second operation OP2 may be terminated based on at least one of the number of repetitions (executing time number n0) or the elapsed time to.

Figure 4:
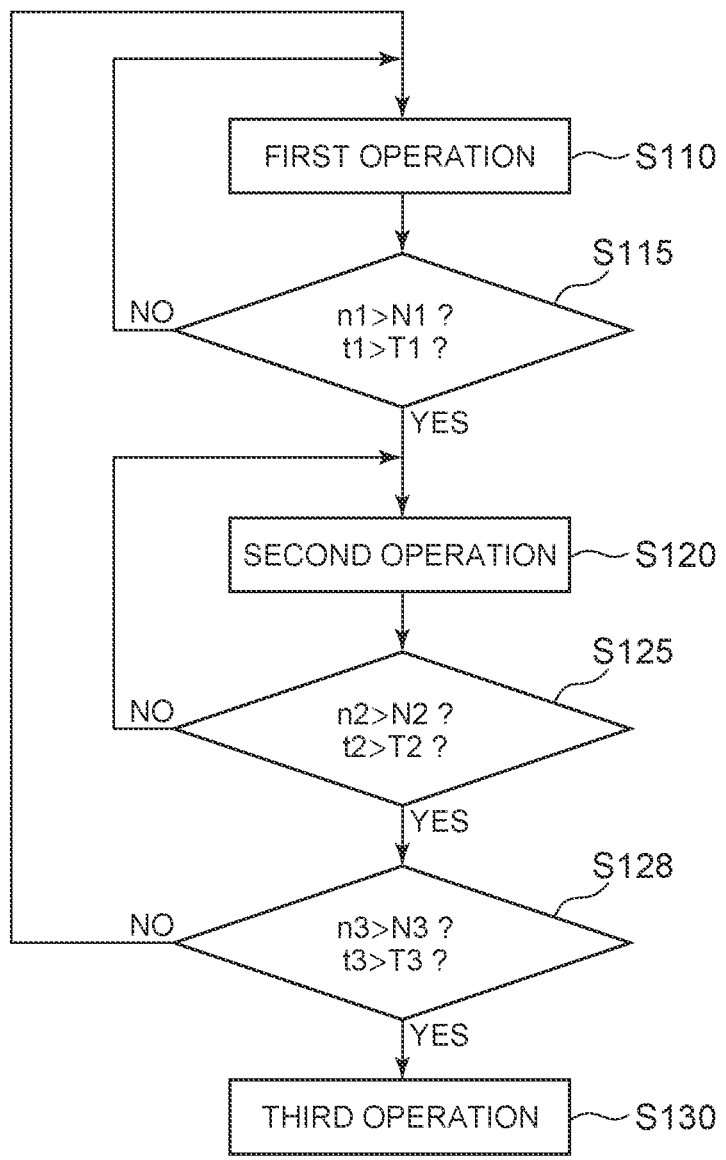
FIG. 4 is a flowchart illustrating the sensor according to the first embodiment.

FIG. 4 is a flowchart illustrating the sensor according to the first embodiment.

As shown in FIG. 4, the first operation OP1 is executed (step S110). An executing time number n1 of the first operation OP1 is compared with a first number N1. The executing time number n1 is an integer of 1 or more. Alternatively, the first period t1 of the first operation OP1 is compared with a first value T1 (step S115). If the executing time number n1 does not exceed the first number N1 and the first period t1 does not exceed the first value T1, the process returns to step S110.

If the executing time number n1 exceeds the first number N1, or if the first period t1 exceeds the first value T1, the second operation OP2 is executed (step S120).

Thus, the switch circuit 71 and the detection circuit 72 are configure to repeat the first operation OP1. If the executing time number n1 executing the first operation OP1 exceeds the first number N1 or if the first period t1 of repeatedly executing the first operation OP1 exceeds the first value T1, the switch circuit 71 and the detection circuit 72 execute the second operation OP2.

As shown in FIG. 4, the second operation OP2 is executed (step S120). An executing time number n2 of the second operation OP2 is compared with a second number N2. The executing time number n2 is an integer of 1 or more. Alternatively, the second period t2 of the second operation OP2 is compared with a second value T2 (step S125). If the executing time number n2 does not exceed the second number N2 and the second period t2 does not exceed the second value T2, the process returns to step 120.

If the executing time number n2 exceeds the second number N2, or if the second period t2 exceeds the second value T2, step S128 is executed. In step S128, ab executing time number n3 of the first operation OP1 and the second operation OP2 is compared with a third number N3. The executing time number n3 is an integer of 1 or more. The executing time number n3 corresponds to the number of times of a loop including the plurality of first operations OP1 and the plurality of second operations OP2. Alternatively, a third period t3 of the executing the first operation OP1 and the second operation OP2 is compared with a third value T3. The third period t3 corresponds to the elapsed time of the loop including the plurality of first operations OP1 and the plurality of second operations OP2. If the executing time number n3 does not exceed the third number N3 and the third period t3 does not exceed the third value T3, the process returns to step S110.

If the executing time number n3 exceeds the third number N3 or the third period t3 exceeds the third value T3, the third operation (step S130) is executed. As described above, in the third operation, for example, information (for example, an alarm) including that the end of life comes soon is output. The information is output, for example, by the operation controller 74.

Thus, the switch circuit 71 and the detection circuit 72 are configured to repeat the second operation OP2. If the executing time number n2 of repeating the second operation OP2 exceeds the second number N2 or if the second period t2 of repeating the second operation OP2 exceeds the second value T2, the switch circuit 71 and the detection circuit 72 may execute the first operation OP1.

In embodiments, stable detection can be performed over a long period of time. A long life is obtained. High precision detection is obtained in a long period of time.

As shown in FIGS. 1 and 2, the sensor system 210 according to the embodiment includes the sensor 110 according to the embodiment and the operation controller 74. The operation controller 74 is configured to control at least one of the transition from the first operation OP1 to the second operation OP2 and the transition from the second operation OP2 to the first operation OP1 in the switch circuit 71. The operation controller 74 may be provided at a location different from the location where the sensor 110 is provided. The operation controller 74 may be provided at a location different from the location where the switch circuit 71 is provided. Information (signals) between the operation controller 74 and the switch circuit 71 may be transmitted or received by any wired or wireless method.

Examples of the detection device 10 will be described below.

Figure 5:
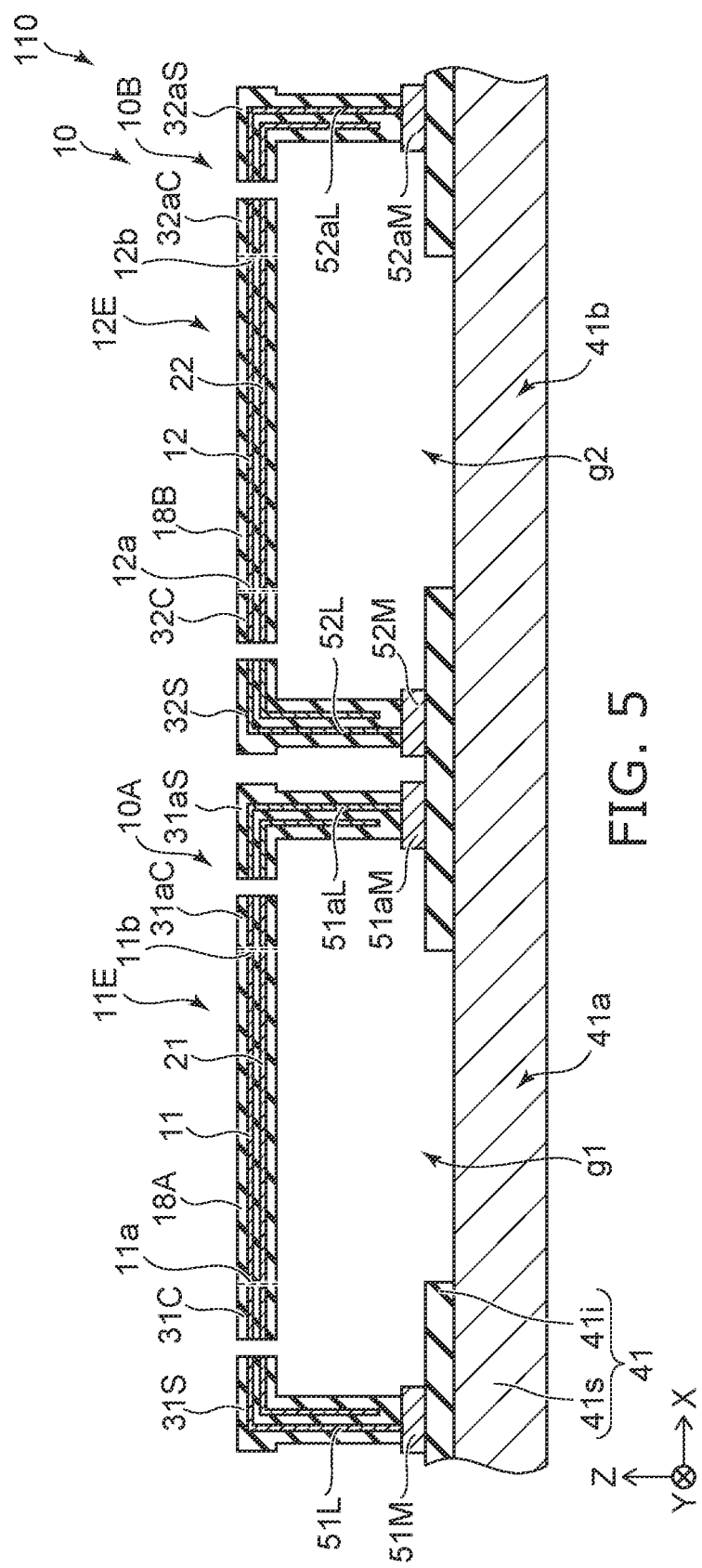
FIG. 5 is a schematic cross-sectional view illustrating a part of the sensor according to the first embodiment.
Figure 6A:
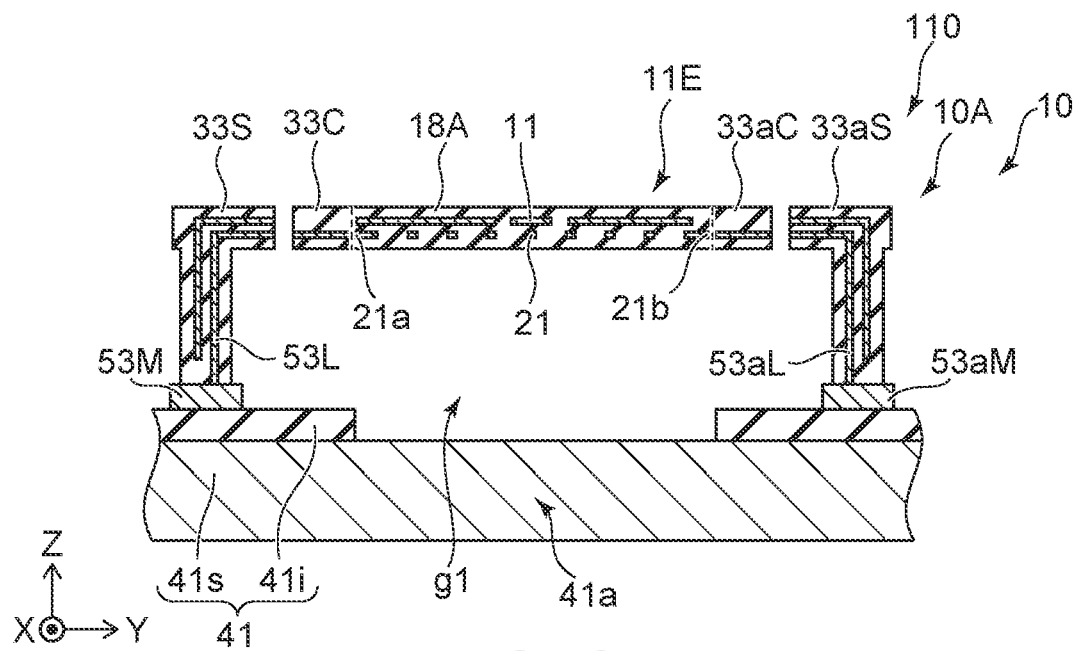
FIGS. 6A and 6B are schematic cross-sectional views illustrating a part of the sensor according to the first embodiment.
Figure 6B:
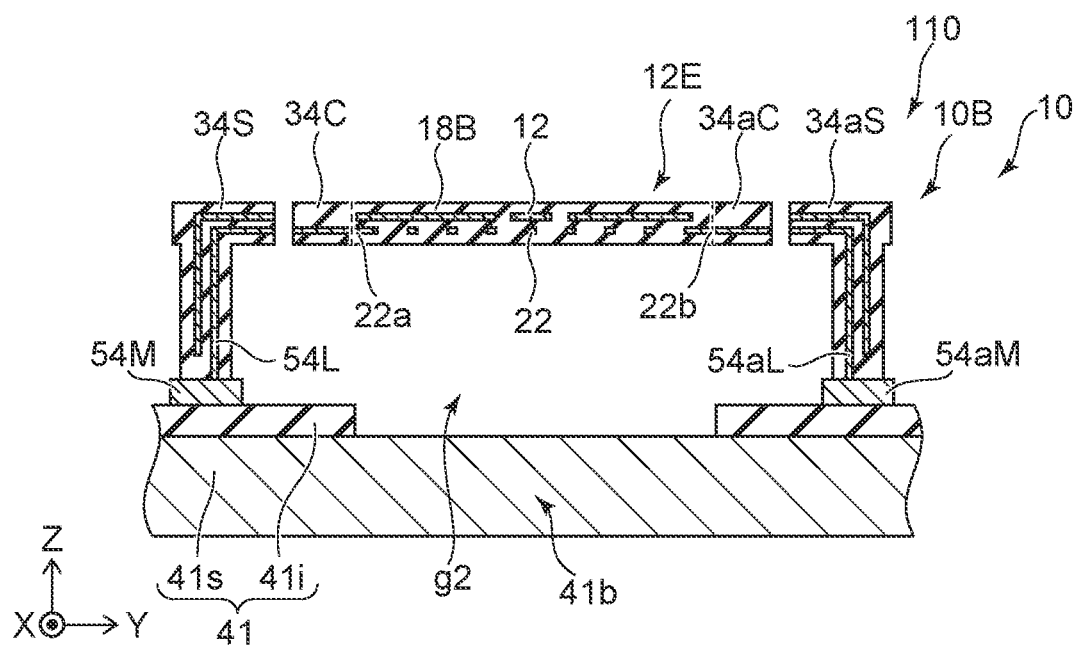

FIGS. 5, 6A and 6B are schematic cross-sectional views illustrating a part of the sensor according to the first embodiment.

Figure 7:
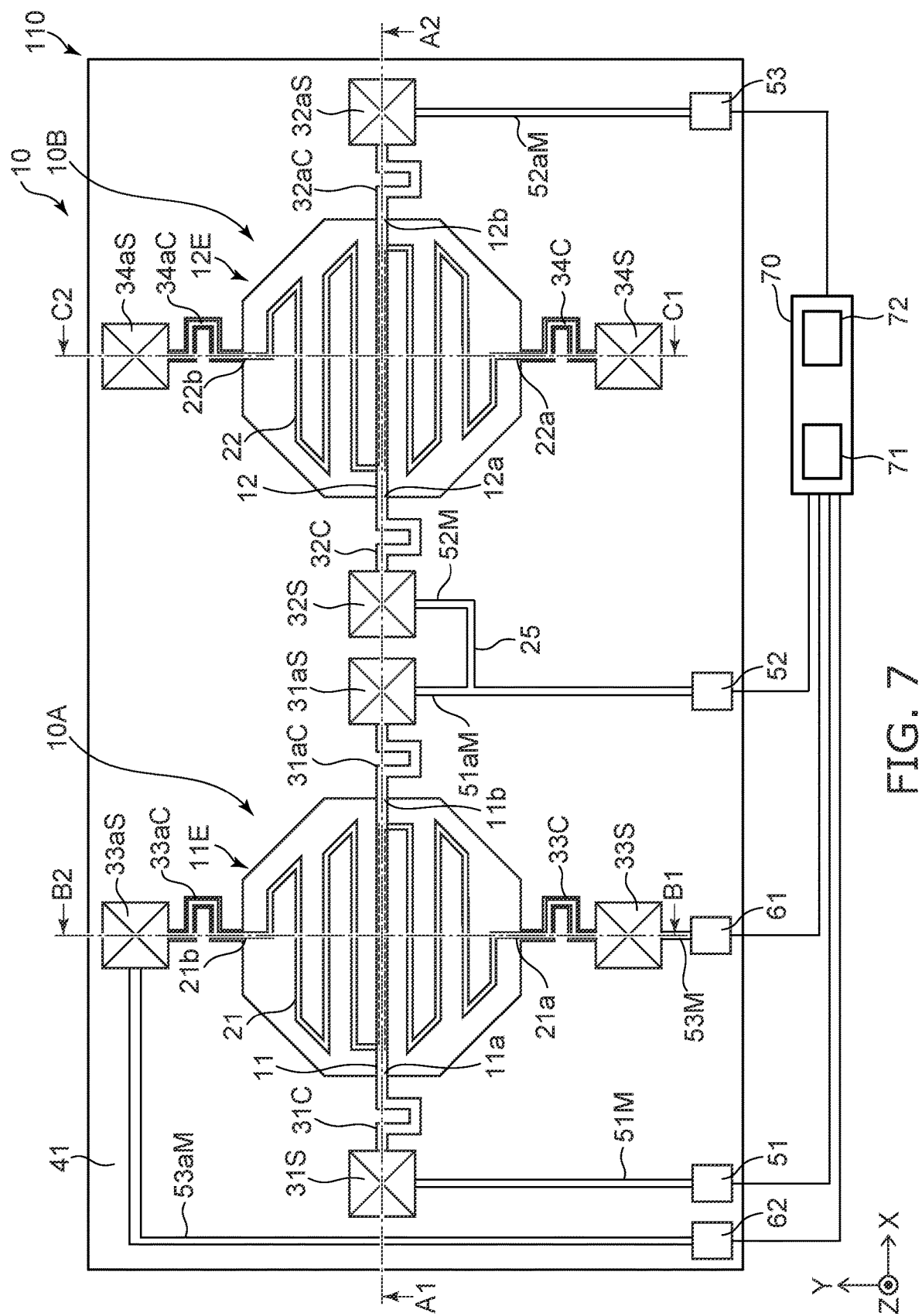
FIG. 7 is a schematic plan view illustrating a part of the sensor according to the first embodiment.

FIG. 7 is a schematic plan view illustrating a part of the sensor according to the first embodiment.

FIG. 5 is a cross-sectional view taken along the line A1-A2 of FIG. 7. FIG. 6A is a cross-sectional view taken along the line B1-B2 of FIG. 7. FIG. 6B is a cross-sectional view taken along the line C1-C2 of FIG. 7.

As shown in FIGS. 5, 6A, 6B and 7, in the sensor 110, the detection device 10 includes the first detection section 10A and the second detection section 10B.

In this example, the detection device 10 includes a base body 41. The base body 41 includes a first base region 41a and a second base region 41b. The first detection section 10A is provided at the first base region 41a. The second detection section 10B is provided at the second base region 41b.

In this example, the first base region 41a is continuous with the second base region 41b. The boundary between the first base region 41a and the second base region 41b may be clear or indefinite. The first base region 41a may be separated from the second base region 41b.

In this example, the base body 41 includes a substrate 41s and an insulating film 41i. The substrate 41s may be, for example, a semiconductor substrate (for example, a silicon substrate). The substrate 41s may include, for example, a semiconductor circuit. The substrate 41s may include a connecting member such as a via-electrode.

A direction from the first base region 41a to the first detection section 10A is defined as a Z-axis direction. One direction perpendicular to the Z-direction is defined as an X-direction. The direction perpendicular to the Z-axis direction and the X-axis direction is defined as a Y-axis direction. The direction from the second base region 41b to the second detection section 10B is along the Z-axis direction.

As described above, the first detection section 10A includes the first detection element 11E. The first detection element 11E includes the first conductive member 21 and the first resistance member 11. The first resistance member 11 may include a first resistance portion 11a and a first resistance other portion 11b. The first conductive member 21 may include a first conductive portion 21a and a first conductive other portion 21b.

In this example, the first detection section 10A further includes a first connection portion 31C and a first support portion 31S. The first support portion 31S is fixed to the base body 41. A part of the first connection portion 31C is supported by the first support portion 31S. Another part of the first connection portion 31C supports the first detection element 11E to be away from the first base region 41a. A first gap g1 is provided between the first base region 41a and the first detection element 11E.

In this example, the first detection section 10A further includes a first other connection portion 31aC and a first other support portion 31aS. The first other support portion 31aS is fixed to the base body 41. A part of the first other connection part 31aC is supported by the first other support portion 31aS. Another portion of the first other connection portion 31aC supports the first detection element 11E to be away from the first base region 41a. In this example, at least a part of the first detection element 11E is provided between the first connection portion 31C and the first other connection portion 31aC.

As described above, the second detection section 10B includes the second detection element 12E. The second detection element 12E includes the second resistance member 12 and the second conductive member 22. The second resistance member 12 may include a second resistance portion 12a and a second resistance other portion 12b. The second conductive member 22 may include a second conductive portion 22a and a second conductive other portion 22b.

In this example, the second detection section 10B further includes a second connection portion 32C and a second support portion 32S. The second support portion 32S is fixed to the base body 41. A part of the second connection portion 32C is supported by the second support portion 32S. Another part of the second connection portion 32C supports the second detection element 12E to be away from the second base region 41b. A second gap f2 is provided between the second base region 41b and the second detection element 12E.

In this example, the second detection section 10B further includes the second other connection portion 32aC and the second other support portion 32aS. The second support portion 32aS is fixed to the base body 41. A part of the second other connection portion 32aC is supported by the second other support portion 32aS. Another part of the second other connection portion 32aC supports the second detection element 12E to be away from the second base region 41b. In this example, at least a part of the second detection element 12E is provided between the second connection portion 32C and the second other connection portion 32aC.

By the first detection element 11E and the second detection element 12E being supported apart from the base body 41, the heat of these detection elements is suppressed from being conducted through the base body 41. As a result, stable detection of the detection object with high sensitivity becomes easy.

As shown in FIG. 7, in this example, the detection device includes a first resistance terminal 51, a second resistance terminal 52, a third resistance terminal 53, a first conductive terminal 61, and a second conductive terminal 62.

The first resistance terminal 51 is electrically connected to the first resistance portion 11a. In this example, the second resistance terminal 52 is electrically connected to the first resistance other portion 11b and the second resistance portion 12a. The third resistance terminal 53 is electrically connected to the second resistance other portion 12b.

In this example, a connecting conductive member 25 is provided. The connecting conductive member 25 is provided on the base body 41. The connecting conductive member 25 electrically connects the first resistance other portion 11b and the second resistance portion 12a. In this example, the second resistance terminal 52 is electrically connected to the first resistance other portion 11b and the second resistance portion 12a through the connecting conductive member 25.

The first conductive terminal 61 is electrically connected to the first conductive portion 21a. The second conductive terminal 62 is electrically connected to the first conductive other portion 21b.

As shown in FIG. 7, a controller 70 may be provided in the sensor 110. The controller 70 includes the switch circuit 71 and the detection circuit 72. The controller 70 is electrically connected to the first resistance terminal 51, the second resistance terminal 52, the third resistance terminal 53, the first conductive terminal 61, and the second conductive terminal 62. In the controller 70, the first operation OP1 and the second operation OP2 are executed.

As shown in FIG. 5, the first detection section 10A (and the first detection element 11E) may include a first insulating portion 18A. The second detection section 10B (and the second detection element 12E) may include a second insulating portion 18B. At least a part of the first insulating portion 18A is provided around the first resistance member 11 and the first conductive member 21. A part of the first insulating portion 18A is provided between the first resistance member 11 and the first conductive member 21. At least a part of the second insulating portion 18B is provided around the second resistance member 12 and the second conductive member 22. A part of the second insulating portion 18B is provided between the second resistance member 12 and the second conductive member 22. The second insulating portion 18B has substantially the same structure as the first insulating portion 18A. The length, width, thickness and material of the second insulating portion 18B are substantially the same as the length, width, thickness and material of the first insulating portion 18A.

As shown in FIG. 5, the first detection section 10A may further include the first conductive layer 51L. The first conductive layer 51L is electrically connected to the first resistance portion 11a of the first resistance member 11. At least a part of the first conductive layer 51L may be provided in the first support portion 31S. In this example, the first conductive layer 51L is electrically connected to a wiring layer 51M provided on the base body 41. The wiring layer 51M is electrically connected to the first resistance terminal 51 (see FIG. 7).

As shown in FIG. 5, the second detection section 10B may further include the second conductive layer 52L. The second conductive layer 52L is electrically connected to the second resistance portion 12a of the second resistance member 12. At least a part of the second conductive layer 52L may be provided in the second support portion 32S. In this example, the second conductive layer 52L is electrically connected to a wiring layer 52M provided on the base body 41. The wiring layer 52M is electrically connected to the second resistance terminal 52 (see FIG. 7).

A current flowing between the first resistance terminal 51 and the first resistance portion 11a flows through the first conductive layer 51L. A current flowing between the second resistance terminal 52 and the second resistance portion 12a flows through the second conductive layer 52L.

The first detection section 10A may further include a first other conductive layer 51aL. The first other conductive layer 51aL is electrically connected to the first resistance other portion 11b of the first resistance member 11. At least a part of the first other conductive layer 51aL may be provided in the first other supporting portion 31aS. In this example, the first other conductive layer 51aL is electrically connected to a wiring layer 51aM provided on the base body 41. The wiring layer 51aM is electrically connected to the second resistance terminal 52 (see FIG. 7).

The second detection section 10B may further include a second other conductive layer 52aL. The second other conductive layer 52aL is electrically connected to the second resistance other portion 12b of the second resistance member 12. At least a part of the second other conductive layer 52aL may be provided in the second other supporting portion 32aS. In this example, the second other conductive layer 52aL is electrically connected to a wiring layer 52aM provided on the base body 41. The wiring layer 52aM is electrically connected to the third resistance terminal 53 (see FIG. 7).

As shown in FIGS. 6A and 7, in this example, the first detection section 10A includes a third connection portion 33C and a third support portion 33S. The third support portion 33S is fixed to the base body 41. A part of the third connection portion 33C is supported by the third support portion 33S. Another part of the third connection portion 33C supports the first detection element 11E to be away from the first base region 41a.

In this example, the first detection section 10A includes a third other connection portion 33aC and a third other support portion 33aS. The third other support portion 33aS is fixed to the base body 41. A part of the third other connection portion 33aC is supported by the third other support part 33aS. Another part of the third other connection portion 33aC supports the first detection element 11E to be away from the first base region 41a.

As shown in FIG. 6A, the first detection section 10A may further include a third conductive layer 53L. At least a part of the third conductive layer 53L is provided in the third support portion 33S. In this example, the third conductive layer 53L is electrically connected to a wiring layer 53M provided on the base body 41. The wiring layer 53M is electrically connected to the first conductive terminal 61 (see FIG. 7). The first current i1 flowing between the first conductive terminal 61 and the first conductive portion 21a flows through the third conductive layer 53L.

As shown in FIG. 6A, the first detection section 10A may further include a third other conductive layer 53aL. At least a part of the third other conductive layer 53aL is provided in the third other supporting portion 33aS. In this example, the third other conductive layer 53aL is electrically connected to a wiring layer 53aM provided on the base body 41. The wiring layer 53aM is electrically connected to the second conductive terminal 62 (see FIG. 7). The first current i1 flowing between the second conductive terminal 62 and the first conductive other portion 21b flows through the third other conductive layer 53aL.

As shown in FIGS. 6B and 7, in this example, the second detection section 10B includes a fourth connection portion 34C and a fourth support portion 34S. The fourth support portion 34S is fixed to the base body 41. A part of the fourth connection portion 34C is supported by the fourth support portion 34S. Another part of the fourth connection portion 34C supports the second detection element 12E to be away from the second base region 41b.

In this example, the second detection section 10B includes a fourth other connection portion 34aC and a fourth other support portion 34aS. The fourth support portion 34aS is fixed to the base body 41. A part of the fourth connection portion 34aC is supported by the fourth support portion 34aS. Another part of the fourth connection portion 34aC supports the second detection element 12E to be away from the second base region 41b.

As shown in FIG. 6B, the second detection section 10B may further include a fourth conductive layer 54L. At least a part of the fourth conductive layer 54L is provided in the fourth support portion 34S. In this example, the fourth conductive layer 54L is electrically connected to a wiring layer 54M provided on the base body 41. The fourth conductive layer 54L is electrically connected to the second conductive portion 22a.

As shown in FIG. 6B, the second detection section 10B may further include a fourth other conductive layer 54aL. At least a part of the fourth other conductive layer 54aL is provided in the fourth other supporting portion 34aS. In this example, the fourth conductive layer 54aL is electrically connected to a wiring layer 54aM provided on the base body 41. The fourth conductive layer 54aL is electrically connected to the second conductive other portion 22b.

Figure 8A:
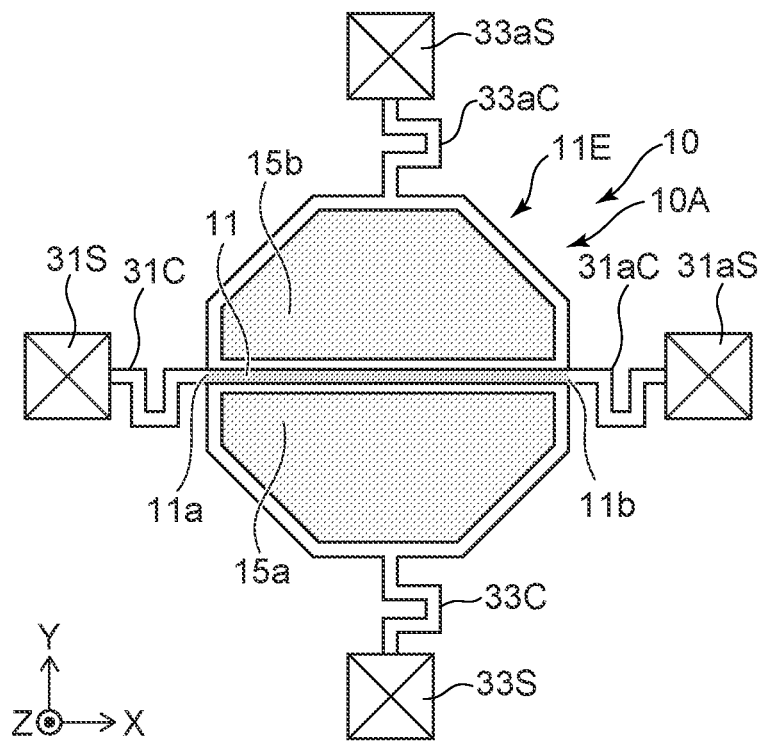
FIGS. 8A and 8B are schematic plan views illustrating a part of the sensor according to the first embodiment.
Figure 8B:
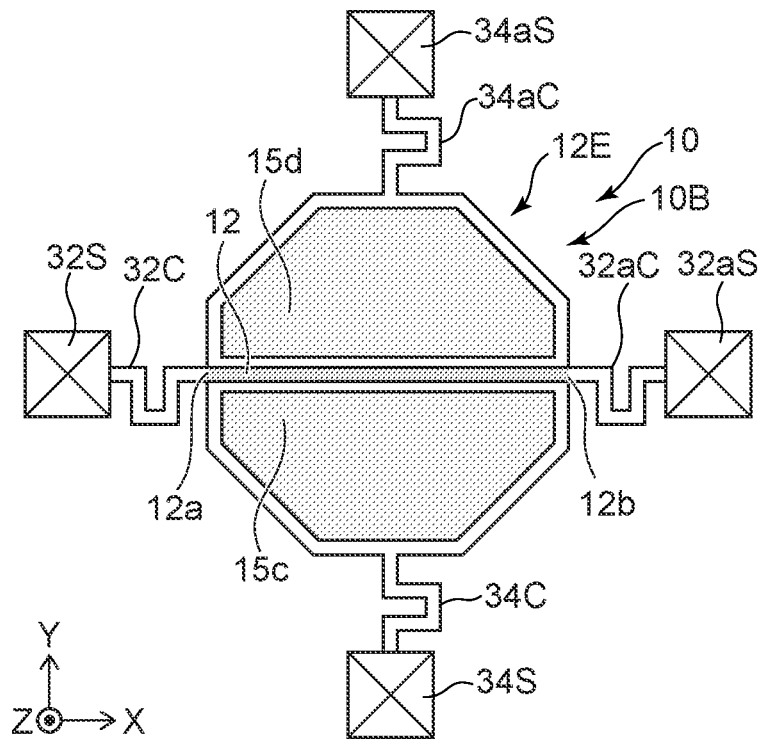

FIGS. 8A and 8B are schematic plan views illustrating a part of the sensor according to the first embodiment.

These views are plan views of a layer including the first resistance member 11 and the second resistance member 12.

As shown in FIG. 8A, the first detection element 11E may include a first layer 15a and a second layer 15b. The first layer 15a and the second layer 15b have the same material and thickness as the first resistance member 11. The first resistance member 11 is provided between the first layer 15a and the second layer 15b. By providing these layers, warpage (deformation) of the first detection element 11E is suppressed.

As shown in FIG. 8b, the second detection element 12E may include a third layer 15c and a fourth layer 15d. The third layer 15c and the fourth layer 15d have the same material and thickness as the second resistance member 12. The second resistance member 12 is provided between the third layer 15c and the fourth layer 15d. By providing these layers, warpage (deformation) of the second detection element 12E is suppressed.

Second Embodiment

Figure 9:
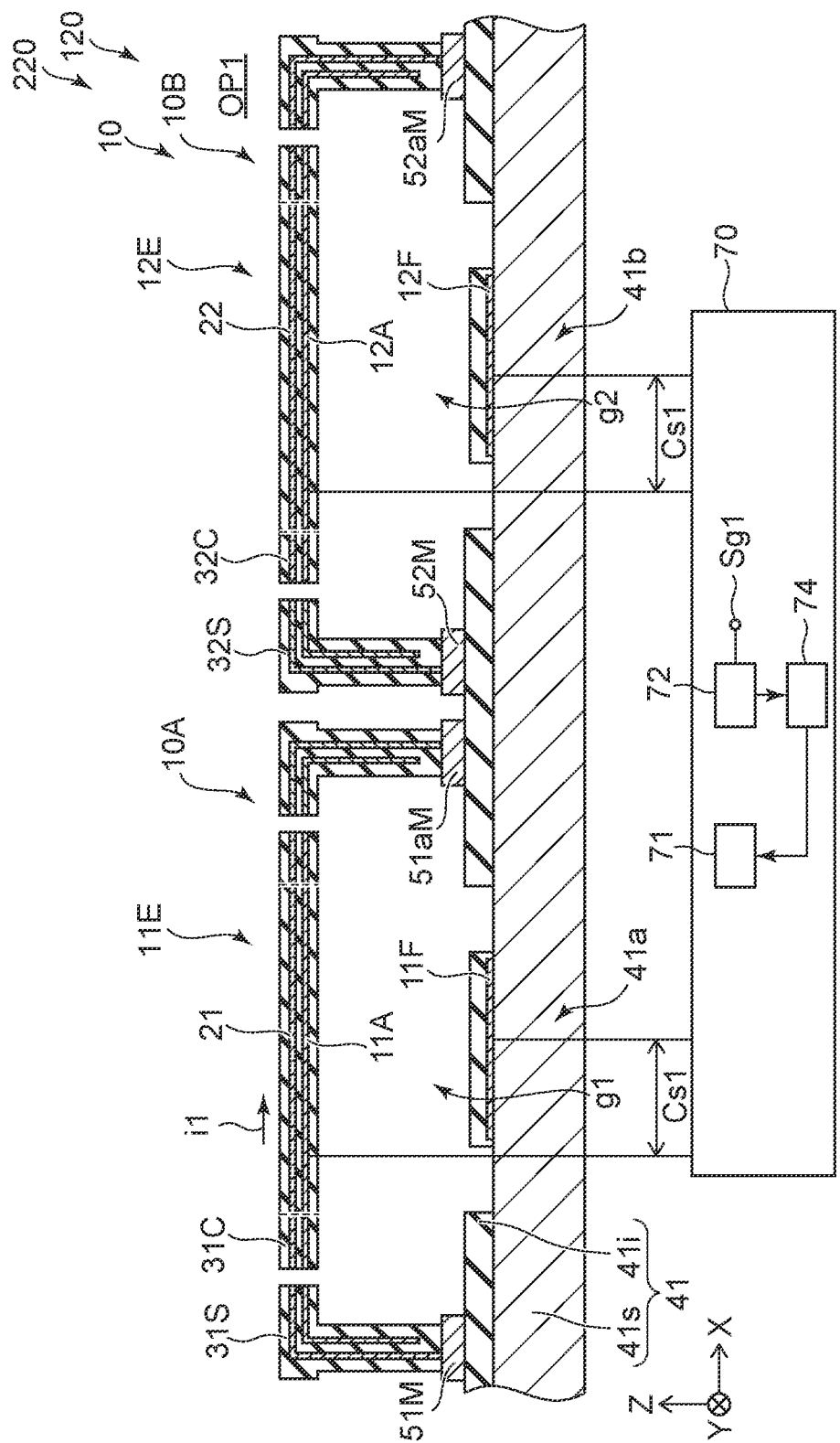
FIG. 9 is a schematic cross-sectional view illustrating a sensor according to a second embodiment.
Figure 10:
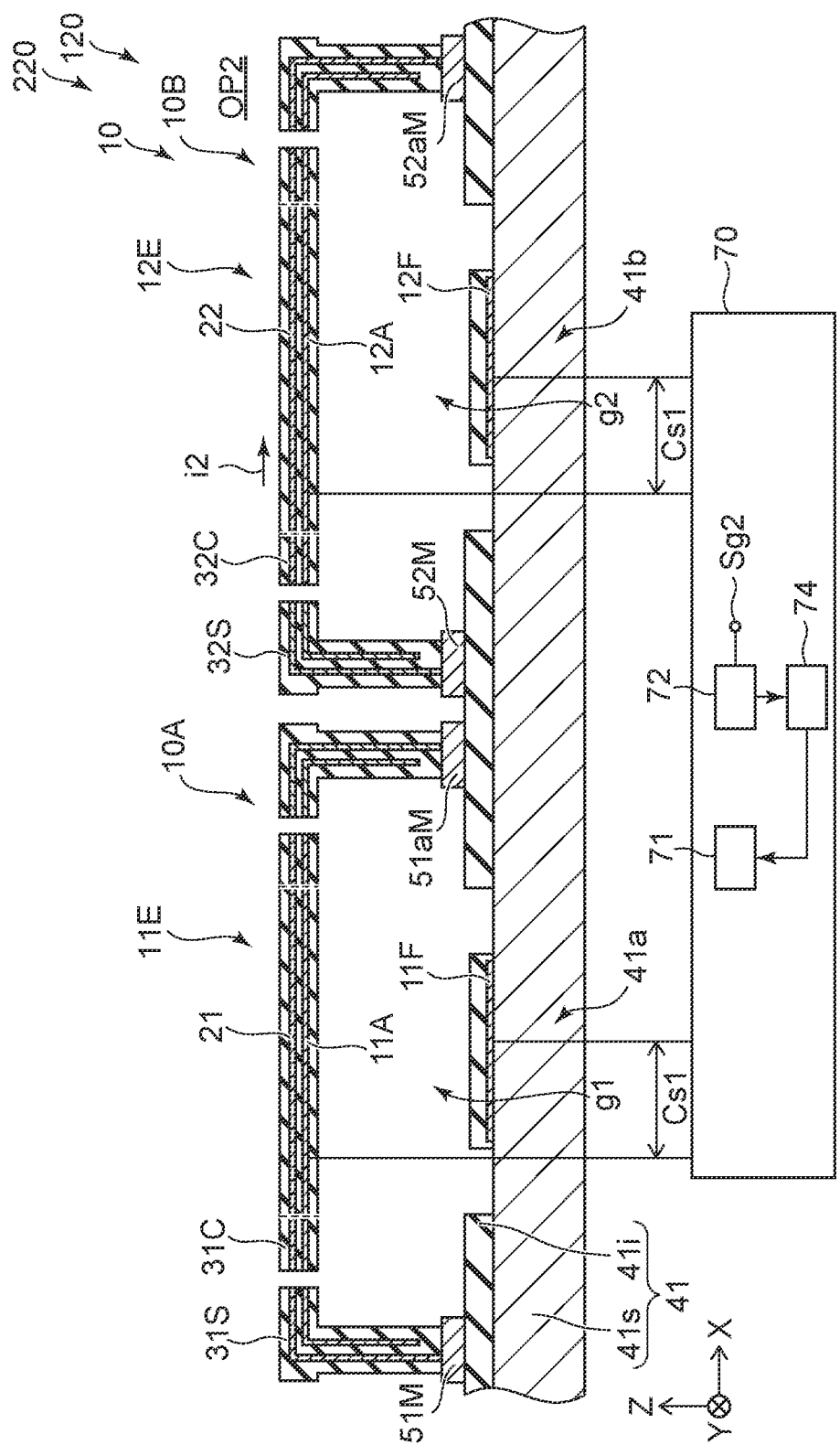
FIG. 10 is a schematic cross-sectional view illustrating a sensor according to the second embodiment.

FIGS. 9 and 10 are schematic cross-sectional views illustrating a sensor according to a second embodiment.

As shown in FIG. 9, a sensor 120 according to the embodiment includes the detection device 10, the switch circuit 71, and the detection circuit 72. The detection device 10 includes the first detection section 10A and the second detection section 10B. In the sensor 120, the configuration of the first detection section 10A and the second detection section 10B is different from the configuration of the first detection section 10A and the second detection section 10B in the sensor 110. Except for this, the configuration of the sensor 120 may be the same as that of the sensor 110.

As shown in FIG. 9, in the sensor 120, the first detection section 10sA includes the first detection element 11E and the first fixed electrode 11F. The first detection element 11E includes the first conductive member 21 and a first movable electrode 11A. The second detection section 10B includes the second detection element 12E and a second fixed electrode 12F. The second detection element 12E includes the second conductive member 22 and a second movable electrode 12A.

In the sensor 120, for example, the first detection element 11E is deformable according to the detection object. For example, the detection object (gas, etc.) is taken into the first detection element 11E. As a result, the volume of the first detection element 11E changes, and the distance between the first detection element 11E and the first fixed electrode 11F changes. A first electric capacitance Cs1 between the first movable electrode 11A and the first fixed electrode 11F changes according to the detection object.

For example, the first current i1 is supplied to the first conductive member 21, and the temperature of the first detection element 11E rises and then falls. For example, as the temperature rises, the detection object taken into the first detection element 11E is released from the first detection element 11E. Alternatively, in response to a change in the temperature of the first detection element 11E, the capture characteristic of the detection object in the first detection element 11E changes. Depending on whether or not the first current i1 is supplied to the first conductive member 21, the change of the first electric capacitance Cs1 according to the detection object changes.

Similarly, for example, the second detection element 12E is deformable according to the detection object. For example, the detection object (gas, etc.) is taken into the second detection element 12E. As a result, the volume of the second detection element 12E changes, and the distance between the second detection element 12E and the second fixed electrode 12F changes. The second electric capacitance Cs2 between the second movable electrode 12A and the second fixed electrode 12F changes according to the detection object.

For example, the second current i2 is supplied to the second conductive member 22, and the temperature of the second detection element 12E rises and then falls. For example, as the temperature rises, the detection object taken into the second detection element 12E is released from the second detection element 12E. Alternatively, in response to a change in the temperature of the second detection element 12E, the capture characteristic of the detection object in the second detection element 12E changes. Depending on whether or not the second current i2 is supplied to the second conductive member 22, the change of the second capacitance Cs2 according to the detection object changes.

For example, by detecting the difference between the first capacitance Cs1 when the first current i1 is not supplied and the second capacitance Cs2 when the second current i2 is supplied, the detection object can be accurately detected. By detecting the difference between the first capacitance Cs1 when the first current i1 is supplied and the second capacitance Cs2 when the second current i2 is not supplied, the detection object can be accurately detected.

In the embodiment, the switch circuit 71 and the detection circuit 72 are execute the first operation OP1 and the second operation OP2. FIG. 9 corresponds to the first operation OP1. FIG. 10 corresponds to the second operation OP2.

In the first operation OP1, the switch circuit 71 supplies the first current i1 to the first conductive member 21 and does not supply the first current i1 to the second conductive member 22. In the first operation OP1, the detection circuit 72 is configured to output the first signal Sg1 corresponding to the difference between the first capacitance Cs1 between the first movable electrode 11A and the first fixed electrode 11F and the second capacitance Cs2 between the second movable electrode 12A and the second fixed electrode 12F.

In the second operation OP2, the switch circuit 71 supplies the second current i2 to the second conductive member 22 and does not supply the second current i2 to the first conductive member 21. In the second operation OP2, the detection circuit 72 is configured to output the second signal Sgt corresponding to the difference between the first capacitance Cs1 and the second capacitance Cs2.

When the temperature change of the first detection element 11E is repeated, the capture characteristic of the detection object in the first detection element 11E changes. When the temperature change of the second detection element 12E is repeated, the capture characteristic of the detection object in the second detection element 12E changes. By performing the first operation OP1 and the second operation OP2, the temperature change is leveled in the first detection element 11E and the second detection element 12E. For example, changes in characteristics over time are suppressed. A sensor capable of stable detection can be provided. For example, life can be extended.

In the second embodiment, the switch circuit 71 and the detection circuit 72 are configured to repeat the set of the first operation OP1 and the second operation OP2.

The switch circuit 71 and the detection circuit 72 may repeat the first operation OP1. If the executing time number n1 of repeating of the first operation OP1 exceeds the first number N1 or if the first period t1 of repeatedly executing the first operation OP1 exceeds the first value T1, the switch circuit 71 and the detection circuit 72 may execute the second operation OP2.

The switch circuit 71 and the detection circuit 72 may repeat the second operation OP2. If the executing time n2 of repeating the second operation OP2 exceeds the second number N2, or if the second period t2 of repeating the second operation OP2 exceeds the second value T2, the switch circuit 71 and the detection circuit 72 may execute the first operation OP1.

In the sensor 120, the operation controller 74 may be provided. The operation controller 74 is configured to control at least one of the transition from the first operation OP1 to the second operation OP2 and the transition from the second operation OP2 to the first operation OP1 in the switch circuit 71.

For example, the sensor system 220 according to the embodiment includes the sensor 120 according to the embodiment and the operation controller 74. The operation controller 74 may be provided at a location different from the location where the sensor 120 is provided. The operation controller 74 may be provided at a location different from the location where the switch circuit 71 is provided. Information (signals) between the operation controller 74 and the switch circuit 71 may be transmitted or received by any wired or wireless method.

As shown in FIGS. 9 and 10, in the sensor 120, the detection device 10 may include the base body 41. The base body 41 includes the first base region 41a and the second base region 41b. The first detection section 10A is provided at the first base region 41a. The second detection section 10B is provided at the second base region 41b.

The first detection section 10A includes the first connection portion 31C and the first support portion 31S. The first support portion 31S is fixed to the base body 41. A part of the first connection portion 31C is supported by the first support portion 31S. Another part of the first connection portion 31C supports the first detection element 11E to be away from the first base region 41a. The first gap g1 is provided between the first base region 41a and the first detection element 11E.

The second detection section 10B includes the second connection portion 32C and the second support portion 32S. The second support portion 32S is fixed to the base body 41. A part of the second connection portion 32C is supported by the second support portion 32S. Another part of the second connection portion 32C supports the second detection element 12E to be away from the second base region 41b. The second gap g2 is provided between the second base region 41b and the second detection element 12E.

In one example, the first connection portion 31C and the second connection portion 32C may include a layer including Pd. The layer including Pd can incorporate, for example, hydrogen. When the detection object include hydrogen, the volume of the layer including Pd changes according to the detection object, and the shapes of the first connection portion 31C and the second connection portion 32C change. The capacitance changes are likely to occur effectively.

Embodiments may include the following configurations (e.g., technical proposals).

Configuration 1

A sensor, comprising:
  a detection device including a first detection section and a second detection section;
  a switch circuit; and
  a detection circuit,
  the first detection section including a first detection element, the first detection element including a first conductive member and a first resistance member,
  the second detection section including a second detection element, the second detection element including a second conductive member and a second resistance member,
  in a first operation, the switch circuit being configured to supply a first current to the first conductive member and not to supply the first current to the second conductive member, and the detection circuit being configured to output a first signal corresponding to a difference between a first electrical resistance of the first resistance member and a second electrical resistance of the second resistance member, and
  in a second operation, the switch circuit being configured to supply a second current to the second conductive member and not to supply the second current to the first conductive member, and the detection circuit being configured to output a second signal corresponding to the difference between the first electrical resistance and the second electrical resistance.

Configuration 2
  The sensor according to Configuration 1, wherein the switch circuit and the detection circuit are configured to repeat the first operation and the second operation.

Configuration 3
  The sensor according to Configuration 1, wherein
    the switch circuit and the detection circuit are configured to repeat the first operation, and
    if an executing time number of the first operation exceeds a first number, or a first period of repeatedly executing the first operation exceeds a first value, the switch circuit and the detection circuit are configured to execute the second operation.

Configuration 4
  The sensor according to Configuration 3, wherein
    the switch circuit and the detection circuit are configured to repeat the second operation, and
    if an executing time number of the second operation exceeds a second number, or a second period of repeatedly executing the second operation exceeds a second value, the switch circuit and the detection circuit are configured to execute the first operation.

Configuration 5
  The sensor according to any one of Configurations 1 to 4, further comprising
    an operation controller, and
    the operation controller being configured to control at least one of a transition from the first operation to the second operation or a transition from the second operation to the first operation in the switch circuit.

Configuration 6
  The sensor according to any one of Configurations 1 to 5, wherein
    the switch circuit includes
      a first switch electrically connected to the first conductive member, and
      a second switch electrically connected to the second conductive member.

Configuration 7
  The sensor according to Configuration 6, wherein
    the switch circuit further includes
      a third switch electrically connected to the first resistance member,
      a fourth switch electrically connected to the second resistance member,
      a fifth switch electrically connected to the first resistance member, and
      a sixth switch electrically connected to the second resistance member,
    the fifth switch is provided in a current path between a first terminal and the first resistance member,
    the third switch is provided in a current path between a second terminal and the first resistance member,
    the sixth switch is provided in a current path between the first terminal and the second resistance member,
    the fourth switch is provided in a current path between the second terminal and the second resistance member, and
    when the third switch is in a non-conductive state, the fourth switch is in a conductive state, the fifth switch is in the conductive state, and the sixth switch is in the non-conductive state Configuration 8
  The sensor according to any one of Configurations 1 to 7, further comprising:
    a first resistance element; and
    a second resistance element,
    the first resistance member, the second resistance member, the first resistance element, and the second resistance element being bridge-connected, and
    the detection circuit being configured to output a signal corresponding to a potential difference between a first connection point of the first resistance member and the second resistance element being bridge-connected, and a second connection point of the first resistance member and the first resistance element bridge-connected.

Configuration 9
  The sensor according to any one of Configurations 1 to 8, wherein
    in the first operation, the first electrical resistance changes according to a concentration of the detection object included in an atmosphere around the first detection element and the second detection element, and in the first operation, the second electrical resistance does not change according to the concentration, or
    a change in the second electrical resistance according to the concentration in the first operation is smaller than a change in the first electrical resistance according to the concentration in the first operation.

Configuration 10
  The sensor according to Configuration 9, wherein
    in the second operation, the second electrical resistance changes in accordance with the concentration, and in the second operation, the first electrical resistance does not change in accordance with the concentration, or
    a change in the first electrical resistance according to the concentration in the second operation is smaller than a change in the second electrical resistance according to the concentration in the second operation.

Configuration 11
  The sensor according to any one of Configurations 1 to 10, wherein
    the detection device further includes a base body including a first base region and a second base region,
    the first detection section is provided at the first base region, and
    the second detection section is provided at the second base region.

Configuration 12
  The sensor according to Configuration 11, wherein
    the first detection section further includes a first connection portion and a first support portion,
    the first support portion is fixed to the base body,
    a part of the first connection portion is supported by the first support portion,
    another part of the first connection portion supports the first detection element to be away from the first base region,
    the second detection section further includes a second connection portion and a second support portion,
    the second support portion is fixed to the base body,
    a part of the second connection portion is supported by the second support portion, and
    another part of the second connection portion supports the second detection element to be away from the second base region.

Configuration 13
  The sensor according to Configuration 12, wherein
    a first air gap is provided between the first base region and the first detection element, and
    a second gap is provided between the second base region and the second detection element.

Configuration 14

A sensor, comprising:
a detection device including a first detection section and a second detection section;
a switch circuit; and
a detection circuit,
the first detection section including a first detection element and a first fixed electrode, the first detection element including a first conductive member and a first movable electrode,
the second detection section including a second detection element and a second fixed electrode, the second detection element including a second conductive member and a second movable electrode,
in a first operation, the switch circuit being configured to supply a first current to the first conductive member and not to supply the first current to the second conductive member, and the detection circuit being configured to output a first signal corresponding to a difference between a first electrical capacitance between the first movable electrode and the first fixed electrode and a second electrical capacitance between the second movable electrode and the second fixed electrode, and
in a second operation, the switch circuit being configured supply a second current to the second conductive member and not to supply the second current to the first conductive member, and the detection circuit being configured to output a second signal corresponding to the difference between the first electrical capacitance and the second electrical capacitance.

Configuration 15

The sensor according to Configuration 14, wherein the switch circuit and the detection circuit are configured to repeat the first operation and the second operation.

Configuration 16

The sensor according to Configuration 14, wherein
the switch circuit and the detection circuit are configured to repeat the first operation, and
if an executing time number of the first operation exceeds a first number, or if the first period of repeatedly executing the first operation exceeds a first value, the switch circuit and the detection circuit are configured to execute the second operation.

Configuration 17

The sensor according to Configuration 16, wherein
the switch circuit and the detection circuit are configured to repeat the second operation, and
if an executing time number of the second operation exceeds a second number, or a second period of repeatedly executing the second operation exceeds a second value, the switch circuit and the detection circuit are configured to execute the first operation.

Configuration 18

The sensor according to any one of Configurations 14 to 17, further comprising
an operation controller,
the operation controller being configured to control at least one of a transition from the first operation to the second operation or transition from the second operation to the first operation in the switch circuit.

Configuration 19

The sensor according to any one of Configurations 14 to 18, wherein
the detection device further includes a base body including a first base region and a second base region,
the first detection section is provided at the first base region,
the second detection section is provided at the second base region,
the first detection section further includes a first connection portion and a first support portion,
the first support portion is fixed to the base body,
a part of the first connection portion is supported by the first support portion,
another part of the first connection portion supports the first detection element to be away from the first base region,
the second detection section further includes a second connection portion and a second support portion,
the second support portion is fixed to the base body,
a part of the second connection portion is supported by the second support portion, and
another part of the second connection portion supports the second detection element to be away from the second base region.

Configuration 20

A sensor system, comprising:
the sensor according to any one of Configurations 1 to 4; and
an operation controller,
the operation controller being configured to control at least one of a transition from the first operation to the second operation or a transition from the second operation to the first operation in the switch circuit.

According to the embodiments, it is possible to provide a sensor and a sensor system capable of stable detection.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors and sensor systems such as bae bodies, detection sections, circuits, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and sensor systems practicable by an appropriate design modification by one skilled in the art based on the sensors and sensor systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a detection device including a first detection section and a second detection section;
a switch circuit; and
a detection circuit,
the first detection section including a first detection element, the first detection element including a first conductive member and a first resistance member,
the second detection section including a second detection element, the second detection element including a second conductive member and a second resistance member,
in a first operation, the switch circuit being configured to supply a first current to the first conductive member and not to supply the first current to the second conductive member, and the detection circuit being configured to output a first signal corresponding to a difference between a first electrical resistance of the first resistance member and a second electrical resistance of the second resistance member, and
in a second operation, the switch circuit being configured to supply a second current to the second conductive member and not to supply the second current to the first conductive member, and the detection circuit being configured to output a second signal corresponding to the difference between the first electrical resistance and the second electrical resistance,
wherein
the switch circuit and the detection circuit are configured to repeat the first operation, and
if an executing time number of the first operation exceeds a first number, or a first period of repeatedly executing the first operation exceeds a first value, the switch circuit and the detection circuit are configured to execute the second operation.

2. The sensor according to claim 1, wherein the switch circuit and the detection circuit are configured to repeat the first operation and the second operation.

3. The sensor according to claim 1, wherein
the switch circuit and the detection circuit are configured to repeat the second operation, and
if an executing time number of the second operation exceeds a second number, or a second period of repeatedly executing the second operation exceeds a second value, the switch circuit and the detection circuit are configured to execute the first operation.

4. The sensor according to claim 1, further comprising an operation controller,
the operation controller being configured to control at least one of a transition from the first operation to the second operation or a transition from the second operation to the first operation in the switch circuit.

5. A sensor, comprising:
a detection device including a first detection section and a second detection section;
a switch circuit; and
a detection circuit,
the first detection section including a first detection element, the first detection element including a first conductive member and a first resistance member,
the second detection section including a second detection element, the second detection element including a second conductive member and a second resistance member,
in a first operation, the switch circuit being configured to supply a first current to the first conductive member and not to supply the first current to the second conductive member, and the detection circuit being configured to output a first signal corresponding to a difference between a first electrical resistance of the first resistance member and a second electrical resistance of the second resistance member, and
in a second operation, the switch circuit being configured to supply a second current to the second conductive member and not to supply the second current to the first conductive member, and the detection circuit being configured to output a second signal corresponding to the difference between the first electrical resistance and the second electrical resistance,
wherein
the switch circuit includes
a first switch electrically connected to the first conductive member, and
a second switch electrically connected to the second conductive member,
a third switch electrically connected to the first resistance member,
a fourth switch electrically connected to the second resistance member,
a fifth switch electrically connected to the first resistance member, and
a sixth switch electrically connected to the second resistance member,
the fifth switch is provided in a current path between a first terminal and the first resistance member,
the third switch is provided in a current path between a second terminal and the first resistance member,
the sixth switch is provided in a current path between the first terminal and the second resistance member,
the fourth switch is provided in a current path between the second terminal and the second resistance member, and
when the third switch is in a non-conductive state, the fourth switch is in a conductive state, the fifth switch is in the conductive state, and the sixth switch is in the non-conductive state.

6. The sensor according to claim 1, further comprising:
a first resistance element; and
a second resistance element,
the first resistance member, the second resistance member, the first resistance element, and the second resistance element being bridge-connected, and
the detection circuit being configured to output a signal corresponding to a potential difference between a first connection point of the first resistance member and the second resistance element being bridge-connected, and a second connection point of the first resistance member and the first resistance element bridge-connected.

7. The sensor according to claim 1, wherein
in the first operation, the first electrical resistance changes according to a concentration of the detection object included in an atmosphere around the first detection element and the second detection element, and in the first operation, the second electrical resistance does not change according to the concentration, or
a change in the second electrical resistance according to the concentration in the first operation is smaller than a change in the first electrical resistance according to the concentration in the first operation.

8. The sensor according to claim 7, wherein
in the second operation, the second electrical resistance changes in accordance with the concentration, and in the second operation, the first electrical resistance does not change in accordance with the concentration, or a change in the first electrical resistance according to the concentration in the second operation is smaller than a change in the second electrical resistance according to the concentration in the second operation.

9. A sensor, comprising:

a detection device including a first detection section and a second detection section;

a switch circuit; and a detection circuit, the first detection section including a first detection element, the first detection element including a first conductive member and a first resistance member, the second detection section including a second detection element, the second detection element including a second conductive member and a second resistance member, in a first operation, the switch circuit being configured to supply a first current to the first conductive member and not to supply the first current to the second conductive member, and the detection circuit being configured to output a first signal corresponding to a difference between a first electrical resistance of the first resistance member and a second electrical resistance of the second resistance member, and in a second operation, the switch circuit being configured to supply a second current to the second conductive member and not to supply the second current to the first conductive member, and the detection circuit being configured to output a second signal corresponding to the difference between the first electrical resistance and the second electrical resistance, wherein the detection device further includes a base body including a first base region and a second base region, the first detection section is provided at the first base region, and the second detection section is provided at the second base region, the first detection section further includes a first connection portion and a first support portion, the first support portion is fixed to the base body, a part of the first connection portion is supported by the first support portion, another part of the first connection portion supports the first detection element to be away from the first base region, the second detection section further includes a second connection portion and a second support portion, the second support portion is fixed to the base body, a part of the second connection portion is supported by the second support portion, and another part of the second connection portion supports the second detection element to be away from the second base region.

10. The sensor according to claim 9, wherein a first air gap is provided between the first base region and the first detection element, and a second gap is provided between the second base region and the second detection element.

11. A sensor system, comprising:

the sensor according to claim 1; and an operation controller, the operation controller being configured to control at least one of a transition from the first operation to the second operation or a transition from the second operation to the first operation in the switch circuit.

12. The sensor according to claim 1, wherein if the first period of repeatedly executing the first operation exceeds the first value, the switch circuit and the detection circuit are configured to execute the second operation.

* * * * *